(12) United States Patent
Li et al.

(10) Patent No.: US 8,409,326 B2
(45) Date of Patent: *Apr. 2, 2013

(54) HIGH FLUX AND SELECTIVITY SAPO-34 MEMBRANES FOR CO₂/CH₄ SEPARATIONS

(75) Inventors: Shiguang Li, Boulder, CO (US); John L. Falconer, Boulder, CO (US); Richard D. Noble, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 967 days.

This patent is subject to a terminal disclaimer.

(21) Appl. No.: 11/746,191

(22) Filed: May 9, 2007

(65) Prior Publication Data
US 2007/0265484 A1 Nov. 15, 2007

Related U.S. Application Data

(60) Provisional application No. 60/800,343, filed on May 15, 2006.

(51) Int. Cl.
| | |
|---|---|
| *B01D 53/22* | (2006.01) |
| *B01D 39/00* | (2006.01) |
| *B01D 29/00* | (2006.01) |
| *B01D 39/06* | (2006.01) |
| *B29C 65/00* | (2006.01) |
| *B29C 44/04* | (2006.01) |

(52) U.S. Cl. ........... 95/50; 95/52; 210/500.25; 210/490; 264/41; 264/42; 264/45.1; 55/523; 55/524

(58) Field of Classification Search ............ 210/500.25, 210/500.26, 490; 264/41, 42, 45.1; 502/4, 502/60, 64; 427/426, 372.2, 430.1, 435; 95/45–52; 55/223–224, 523–524
See application file for complete search history.

(56) References Cited

U.S. PATENT DOCUMENTS

| | | | |
|---|---|---|---|
| 3,404,086 | A | 10/1968 | Plank et al. |
| 3,644,200 | A | 2/1972 | Young |
| 4,414,005 | A | 11/1983 | De Bievre et al. |
| 4,440,871 | A | 4/1984 | Lok et al. |
| 4,775,396 | A | 10/1988 | Rastelli et al. |
| 5,100,596 | A * | 3/1992 | Haag et al. ............ 506/22 |

(Continued)

FOREIGN PATENT DOCUMENTS

| | | |
|---|---|---|
| CN | 1106715 | 8/1995 |
| CN | 1167005 A | 12/1997 |

(Continued)

OTHER PUBLICATIONS

Ahn et al. (Aug. 1, 2006) "Pervaporation of Dichlorinated Organic Compounds Through Silicalite-1 Zeolite Membrane," *J. Membr. Sci.* 279(1-2):459-465.

(Continued)

*Primary Examiner* — Ana Fortuna
(74) *Attorney, Agent, or Firm* — Lathrop & Gage LLP

(57) ABSTRACT

SAPO-34 membranes and methods for their preparation and use are described. The SAPO-34 membranes are prepared by contacting at least one surface of a porous membrane support with a synthesis gel. The Si/Al ratio of the synthesis gel can be from 0.3 to 0.15. SAPO-34 crystals are optionally applied to the surface of the support prior to synthesis. A layer of SAPO-34 crystals is formed on at least one surface of the support. SAPO-34 crystals may also form in the pores of the support. SAPO-34 membranes of the invention can have improved selectivity for certain gas mixtures, including mixtures of carbon dioxide and methane.

19 Claims, 4 Drawing Sheets

U.S. PATENT DOCUMENTS

| | | | |
|---|---|---|---|
| 5,143,876 A | 9/1992 | Chang et al. | |
| 5,248,647 A | 9/1993 | Barger | |
| 5,296,208 A | 3/1994 | Lesch | |
| 5,362,522 A | 11/1994 | Barri et al. | |
| 5,464,798 A | 11/1995 | Jia et al. | |
| 5,557,030 A | 9/1996 | Markovs et al. | |
| 5,567,664 A | 10/1996 | Barri et al. | |
| 5,605,631 A * | 2/1997 | Barri et al. | 210/650 |
| 5,716,527 A | 2/1998 | Deckman et al. | |
| 5,779,904 A | 7/1998 | Ruderman et al. | |
| 5,785,947 A | 7/1998 | Zones et al. | |
| 5,824,617 A | 10/1998 | Lai | |
| 5,830,429 A | 11/1998 | Balkus et al. | |
| 5,871,650 A | 2/1999 | Lai | |
| 5,935,440 A * | 8/1999 | Bratton et al. | 210/500.25 |
| 6,051,745 A | 4/2000 | Wu et al. | |
| 6,051,746 A | 4/2000 | Sun et al. | |
| 6,074,457 A | 6/2000 | Anthonis et al. | |
| 6,090,289 A | 7/2000 | Verduijn et al. | |
| 6,140,263 A | 10/2000 | Anstett et al. | |
| 6,177,373 B1 * | 1/2001 | Sterte et al. | 502/4 |
| 6,193,784 B1 | 2/2001 | Yazawa et al. | |
| 6,472,016 B1 | 10/2002 | Soria et al. | |
| 6,503,294 B2 * | 1/2003 | Yoshikawa et al. | 95/45 |
| 6,514,899 B1 | 2/2003 | Mertens et al. | |
| 6,660,682 B2 * | 12/2003 | Cao et al. | 502/214 |
| 6,696,032 B2 | 2/2004 | Mertens et al. | |
| 6,756,516 B2 | 6/2004 | Mees et al. | |
| 6,767,384 B1 | 7/2004 | Vu et al. | |
| 6,897,180 B2 | 5/2005 | Mees et al. | |
| 6,903,240 B2 | 6/2005 | Mertens et al. | |
| 7,011,810 B2 | 3/2006 | Dakka et al. | |
| 7,014,587 B2 | 3/2006 | Grundle et al. | |
| 7,014,827 B2 | 3/2006 | Mertens et al. | |
| 7,087,794 B2 * | 8/2006 | Risch et al. | 568/405 |
| 7,309,806 B2 | 12/2007 | Loezos et al. | |
| 7,309,906 B1 | 12/2007 | Tyhach et al. | |
| 7,316,727 B2 * | 1/2008 | Falconer et al. | 95/51 |
| 7,828,875 B2 | 11/2010 | Li et al. | |
| 7,909,917 B2 | 3/2011 | Nonaka et al. | |
| 2003/0149321 A1 | 8/2003 | Mees et al. | |
| 2003/0220188 A1 | 11/2003 | Marand | |
| 2004/0215044 A1 | 10/2004 | Mertens et al. | |
| 2005/0003956 A1 | 1/2005 | Fuglerud et al. | |
| 2005/0171394 A1 | 8/2005 | Fuglerud et al. | |
| 2005/0204916 A1 | 9/2005 | Falconer et al. | |
| 2005/0229779 A1 | 10/2005 | Nakayama et al. | |
| 2006/0079725 A1 * | 4/2006 | Li et al. | 585/818 |
| 2006/0252631 A1 | 11/2006 | Deckman et al. | |
| 2008/0216650 A1 | 9/2008 | Falconer et al. | |
| 2009/0007780 A1 | 1/2009 | Yajima et al. | |
| 2010/0102001 A1 | 4/2010 | Falconer et al. | |
| 2010/0116130 A1 | 5/2010 | Carreon et al. | |
| 2011/0113958 A1 | 5/2011 | Carreon et al. | |
| 2012/0006194 A1 | 1/2012 | Falconer et al. | |

FOREIGN PATENT DOCUMENTS

| | | |
|---|---|---|
| JP | 2001-146416 A | 5/2001 |
| RU | 2174044 | 9/2001 |
| RU | 2179064 | 2/2002 |
| RU | 2183499 | 6/2002 |
| WO | WO 94/25152 | 11/1994 |
| WO | WO 97/25129 | 7/1997 |
| WO | WO 97/33684 | 9/1997 |
| WO | WO 97/37752 A | 10/1997 |
| WO | WO 00/06493 | 2/2000 |
| WO | WO 02/074421 | 9/2002 |
| WO | WO 03/048042 | 6/2003 |
| WO | WO 2004/096709 | 11/2004 |
| WO | WO 2007/134094 | 11/2007 |
| WO | WO 2008/112520 | 9/2008 |

OTHER PUBLICATIONS

Aoki et al. (1998) "Gas Permeation Properties of A-Type Zeolite Membrane Formed on Porous Substrate by Hydrothermal Synthesis," *AlChe J.* 141:197-205.

Australian Patent Office Search Report Corresponding to Application No. SG 200808108-5, Mailed Dec. 1, 2009.

Bakker et al. (1996) "Permeation Characteristics of a Metal-Supported Silicalite-1 Zeolite Membrane," *J. Membrane Sci.* 117:57-78.

Breck, D.W. (1974) *Zeolite Molecular Sieves*, Krieger Publishing Company. Malabar, Florida, pp. 460-465,498-503,570-573.

Buchholz et al. (2004) "Sequential Steps of Ammoniation of the Microporous Silicoaluminophosphates H-SAPO-34 and H-SAPO-37 Investigated by In Situ CF MAS NMR Spectroscopy," *J. Phys. Chem. B* 108:3107-3113.

Camblor et al. (1998) Synthesis and Structural Characterization of MWW Type Zeolite ITQ-1, the Pure Silica Analog of MCM-22 and SSZ-25 *J. Phys. Chem. B* 102(1):44-51.

Carreon et al. (2008) "Alumina-Supported SAPO-34 Membranes for $CO_2/CH_4$ Separation," *J. Am. Chem. Soc.* 130:5412-5413.

Carreon et al. (2008) "SAPO-34 Seeds and Membranes Prepared Using Multiple Structure Directing Agents," *Adv. Mater.* 20:729-732.

Dyer et al. (1988) *An Introduction to Zeolite Molecular Sieves*, John Wiley and Sons, New York, pp. 1-3,12-15,20-25,36-37,54,57,118-124.

Eurasian Search Report Corresponding to Russian Application No. 200802326, Mailed Dec. 9, 2009.

Flanigan et al. (1986) "Aluminophosphate Molecular Sieves and the Periodic Table," *Pure Appl. Chem.* 58(10):1351-1358.

Guan et al. (2002) "Separation of Nitrogen From Oxygen Using a Titanosilicate Membrane Prepared on a Porous α-Alumina Support Tube," *Sep. Sci. Technol.* 37(5):1031-1039.

Gues et al. (1992) "Synthesis and Characterization of Zeolite (MFI) Membranes on Porous Ceramic Supports," *J. Chem. Soc. Faraday Trans.* 88:3101-3109.

Gump et al. (2001) "Aromatic Permeation Through Crystalline Molecular Sieve Membranes," *Ind. Engr. Chem. Res.* 40(2):565-577.

Gump et al. (2000) "$CO_2$ Separation Using Zeolite Membranes," *Proceedings of Coal Research Contractors Review Meeting*, Jun. 6-7, 2000, http://www.netl.doe.gov/publications/proceedings/00/ucr00/noble.pdf, Accessed Jun. 17, 2010.

Ha et al. (2000) "Facile Assembly of Zeolite Monolayers on Glass, Silica, Alumina, and Other Zeolites Using 3-Halopropylsily Reagents as Covalent Linkers," *Adv. Mater.* 12(15):1114-1117.

Hedlund et al. (2002) "High-Flux MFI Membranes," *Micro. Meso. Mater.* 52:179-189.

International Search Report and Written Opinion, Corresponding to International Application No. PCT/US07/68542, Mailed May 8, 2008.

Jhung et al. (2003) "Selective Formation of SAPO-5 and SAPO-34 Molecular Sieves with Microwave Irradiation and Hydrothermal Heating," *Micro. Meso. Mater.* 64:33-39.

Jia et al. (1993) "Ceramic Zeolite Composite Membranes," *J. Membr. Sci.* 82:15-26.

Kang et al. (2002) "Intrapore Synthesis of Silicalite Membranes at Temperatures Below 100°C," *Ind. Eng. Chem. Res.* 41:3145-3150.

Kärger et al. (1992) *Diffusion in Zeolites*, John Wiley and Sons, New York, pp. 9-10.

Keizer et al. (1998) "Two Component Permeation Through Thin Zeolite MFI Membranes," *J. Memb. Sci.* 147:159-172.

Kusakabe et al. (1997) "Formation of a Y-Type Membrane on a Porous α-Alumina Tube for Gas Separation," *Ind. Eng. Chem. Res.* 36:649-655.

Li et al. (Web Release Feb. 1, 2010) "Scale-Up of SAPO-34 Membranes for $CO_2/CH_4$ Separation," *J. Membr. Sci.* 352(1-2):7-13.

Li et al. (2002) "ZSM-11 Membranes: Characterization and Pervaporation Performance for Alcohol/Water Mixtures." *AlChE J.* 48:269-278.

Li et al. (2004) "SAPO-34 Membranes for $CO_2/CH_4$ Separation," *J. Memb. Sci.* 241:121-135.

Li et al. (2004) "Effects of Impurities on $CO_2/CH_4$ Separations Through SAPO-34 Membranes," *J. Membr. Sci.* 251:59-66.

Li et al. (Web Release Mar. 15, 2005) "High-Pressure $CO_2/CH_4$ Separation Using SAPO-34 Membranes," *Ind. Eng. Chem. Res.* 44(9):3220-3228.

Li et al. (Oct. 2006) "Improved SAPO-34 Membranes for CO2/CH4 Separations," *Adv. Mater.* 18(19):2601-2603.

Lin et al. (2001) "Silicalite Membrane Preparation, Characterization, and Separation Performance," *Ind. Eng. Chem. Res.* 40:4069-4078.
Lixiong et al. (1997) "Synthesis of SAPO-34/Ceramic Composite Membranes," *Stud. Surf. Sci. Catl.* 105:2211-2215.
Mabande et al. (Web Release Oct. 26, 2005) "Preparation of b-Oriented MFI Films on Porous Stainless Steel Substrates," *Ind. Eng. Chem. Res.* 44(24):9086-9095.
Masuda et al. (1995) "Preparation of an A-Type Zeolite Film on the Surface of an Alumina Ceramic Filter," *Microporous Mat.* 3:565-571.
Masuda et al. (1994) "Preparation of a Dense ZSM-5 Zeolite Film on the Outer of an Alumina Ceramic Filter," *Appl. Catal.* 111:143-150.
Mees et al. (2003) "Improvement of the Hydrothermal Stability of SAPO-34," *Chem. Commun.* 1:44-45.
Mees et al. (2002) "Electronic Supplementary Information (ESI) on the Synthesis Procedure," *Supp. Material for Chem. Commun.*
Meriaudeau et al. (1997) "SAPO-11, SAPO-31, and SAPO-41 Molecular Sieves: Synthesis, Characterization, and Catalytic Properties in n-Octane Hydroisomerization," *J. Catalysis* 169:55-66.
Poshusta et al. (1998) "Synthesis and Permeation Properties of SAPO-34 Tubular Membranes," *Ind. Eng. Chem. Res.* 37:3924-3929.
Poshusta et al. (1999) "Temperature and Pressure Effects on $CO_2$ and $CH_4$ Permeation Through MFI Zeolite Membranes," *J. Membr. Sci.* 160:115-125.
Poshusta et al. (2001) "Characterization of SAPO-34 Membranes by Water Absorption," *J. Membr. Sci.* 186:25-40.
Poshusta et al. (2000) "Separation of Light Gas Mixtures Using SAPO-34 Membranes," *AlChe J.* 46(4):779-789.
Prakash et al. (1994) "Synthesis of SAPO-34: High Silicon Incorporation in the Presence of Morpholine as Template," *J. Chem. Soc. Faraday Trans.* 90(15):2291-2296.
Recipe for SAPO-34, http://www.iza-svnthesis.org/Recipies/SAPO-34.html, Accessed Jan. 15, 2004.
Robeson et al. (Oct. 1, 1991) "Correlation of Separation Factor Versus Permeability for Polymeric Membranes," *J. Membr. Sci.* 62(2):165-185.
Sano et al. (1992) Synthesis and Characterization of Polycrystalline SAPO-5 Film, *J. Mol. Cat.* 77:L19-L26.
Sherman, J.D. (1999) "Synthetic Zeolites and Other Microporous Oxide Molecular Sieves," *Proc. Natl. Acad. Sci. USA* 96:3471-3478.
Singh et al. (2003) In; *Handbook of Zeolite Science and Technology*, Auerbach et al Eds., Marcel Dekker, Inc., New York, pp. 27-31.
Supplementary European Search Report, Corresponding to European Application No. EP 07 76 2043, Completed Apr. 14, 2010.
Szostak, R. (1998) "Synthesis of Molecular Sieve Phosphates," In, "Recent Advances in the Understanding of Zeolite Synthesis," in, *Molecular Sieves, Science and Technology*, Karge et al. Eds., Springer-Verlag, Berlin pp. 161-165.
Thompson, R.W. (1998) "Recent Advances in the Understanding of Zeolite Synthesis," in, *Molecular Sieves, Science and Technology*, Karge et al. Eds., Springer-Verlag, Berlin, pp. 19-31.
Tomita et al. (2004) "Gas Separation Characteristics of DDR Type Zeolite Membrane," *Micropor. Mesopor. Mater.* 68:71-75.
Tsai et al. (1998) "Well-Aligned SAPO-5 Membrane: Preparation and Characterization," *Micropor. Mesopor. Mat.* 22:333-341.
Tuan et al. (2002) "Separating Organics From Water by Pervaporation with Isomorphously-Substituted MFI Zeolite Membranes," *Mem. Sci.* 196:111-123.
Van den Broeke et al. (1999) "Transport and Separation Properties of a Silicalite-1 Membrane, I. Operating Conditions," *Chem. Eng. Sci.* 54:245-258.
Vomscheid et al. (1995) "Reversible Interaction of $NH_3$ with the Framework of Template-Free Zeolite-Type SAPO-34," *J. Chem. Soc. Faraday Trans.* 91(18):3281-3284.
Weh et al. (2002) "Change of Gas Permeation by Photoinduced Switching of Zeolite-Azobenzene Membranes of Type MFI and FAU," *Micropor. Mesopor. Mater.* 54:15-26.
Weh et al. (2002) "Permeation of Single Gases and Gas Mixtures Through Faujasite-Type Molecular Sieve Membranes," *Micropor. Mesopor. Mater.* 54:27-36.
Wilson, S.T. (2001) "Templating in Molecular Sieve Synthesis," In; *Verified Synthesis of Zeolitic Materials*, Robson, H. Ed., Elsevier, 27-31.
Written Opinion, Corresponding to International Application No. PCT/US07/68542, Mailed May 8, 2008.
Xomeritakis et al. (2000) "Transport Properties of Alumina-Supported MFI Membranes Mde by Secondary (Seeded) Growth," *Micropor. Mesopor. Mater.* 38:61-73.
Yan et al. (1995) "Zeolite ZSM-5 Membranes Grown on Porous $\alpha$-$Al_2O_3$," *JCS Chem. Commun.* 2:227-228.
Zecchina et al. (1997) "Vibrational Spectroscopy of $NH_4+$ Ions in Zeolitic Materials: An IF Study," *J. Phys. Chem. B* 101:10128-10135.
Zones et al. (2002) Synthesis of High Silica Zeolites Using a Mixed Quaternart Ammonium Cation, Amine Approach: Discovery of Zeolite SSZ-47 *Chem. Mater.* 14(1):313-320.
Zones et al. (May 4, 2001) "Studies of the Synthesis of SSZ-25 Zeolite in 'Mixed-Template' System," *Chem. Eur. J.* 7(9):1990-2001.
Baerlocher et al. (2001) *Atlas of Zeolite Framework Types*, $5^{th}$ ed., Elsevier, Amsterdam www.iza-structure.org/databases/, 1442, 1464, 38117.
Examination Report Corresponding to Australian Patent Application No. 2007249452, Dated Jul. 30, 2010.
Examination Report Corresponding to New Zealand Patent Application No. 572347, Dated Jun. 10, 2010.
Examination Report and Response, Corresponding to European Application No. EP 07 76 2043, Completed Apr. 14, 2010.
Examination Report Corresponding to GCC Application No. GCC/P/2007/8318, Completed Apr. 6, 2010.
International Search Report Corresponding to International Application No. PCT/US08/56143, Mailed Jun. 5, 2008.
International Search Report Corresponding to International Application No. PCT/US05/027530, Mailed Oct. 10, 2006.
Office Action and Response Corresponding to U.S. Appl. No. 12/044,116, Mailed Jul. 27, 2010.
Supplementary European Search Report, Corresponding to European Application No. EP 05 77 8609, Completed Mar. 25, 2008.
Wong et al. (2001) "Effect of Synthesis Parameters on the Zeolite Membrane Morphololgy," J. Membr. Sci., 193, 141-161.
Written Opinion, Corresponding to International Application No. PCT/US08/56143, Mailed Jun. 5, 2008.
Zhu et al. (1999) "Shape Selectivity in the Adsorption of Propane/Propene on the All-Silica DD3r," *Chem. Commun.* 1453-2454.
Exam Report Corresponding to Vietnamese Patent Application No. 1-2008-03047, Mailed Feb. 28, 2011.
Exam Report Corresponding to Eurasian Patent Application No. 200802326, Mailed Feb. 1, 2011.
Exam Report Corresponding to Eurasian Patent Application No. 200802326 and English Translation, Mailed Sep. 8, 2011.
Exam Report and Search Report Corresponding to Malaysian Patent Application No. PI 20084241, Mailed Jan. 13, 2012.
Li et al. (2008) "SAPO-34 Membranes for CO2/CH4 separations: Effect of Si/AI ratio," *Microporous Mesoporous Mater.* 110:310-317.
McLeary et al. (Feb. 2006), "Zeolite based films, membranes and membrane reactors: Progress and prospects," *Microporous Mesoporous Mater.*, 90 (1-2), 198-220.
Office Action Corresponding to U.S. Appl. No. 12/044,116, mailed Mar. 16, 2011.

\* cited by examiner

HIGH FLUX AND SELECTIVITY SAPO-34 MEMBRANES FOR CO$_2$/CH$_4$ SEPARATIONS

CROSS-REFERENCE TO RELATED APPLICATIONS

This application claims the benefit of U.S. Provisional Application 60/800,343, filed May 15, 2006, which is hereby incorporated by reference to the extent not inconsistent with the disclosure herein.

BACKGROUND OF THE INVENTION

This invention is in the field of silicoaluminophosphate (SAPO) membranes, in particular SAPO-34 membranes prepared on a porous support. The invention provides supported SAPO-34 membranes as well as methods for making and using them.

SAPOs are largely composed of Si, Al, P and O and can have a three-dimensional microporous crystal framework structure of PO$_2^+$, AlO$_2^-$ and SiO$_2$ tetrahedral units. The cages, channels and cavities created by the crystal framework can permit separation of mixtures of molecules based on their effective sizes.

SAPO crystals can be synthesized by hydrothermal crystallization from a reaction mixture containing reactive sources of silica, alumina, and phosphate, and an organic templating agent. Lok et al. (U.S. Pat. No. 4,440,871) report gel compositions and procedures for forming several types of SAPO crystals, including SAPO-5, SAPO-11, SAPO-16, SAPO-17, SAPO-20, SAPO-31, SAPO-34, SAPO-35, SAPO-37, SAPO-40, SAPO 41, SAPO-42, and SAPO-44 crystals. Lok et al. do not appear to disclose formation of SAPO membranes. Prakash and Unnikrishnan report gel compositions and procedures for forming SAPO-34 crystals. (Prakash, A. M. and Unnikrishnan, S., J. Chem. Sc. Faraday Trans., 1994, 90(15), 2291-2296). In several of Prakash and Unnikrishnan's reported procedures, the gel was aged for 24 hours at 27° C. (300 K). Prakash and Unnikrishnan do not appear to disclose formation of SAPO-34 membranes.

SAPO membranes have been proposed for use in gas separations. For these applications, an important parameter is the separation selectivity. For two gas components i and j, a separation selectivity $S_{i/j}$ greater than one implies that the membrane is selectively permeable to component i. If a feedstream containing both components is applied to one side of the membrane, the permeate stream exiting the other side of the membrane will be enriched in component i and depleted in component j. The greater the separation selectivity, the greater the enrichment of the permeate stream in component i.

Barri et al. report supported zeolite membranes (U.S. Pat. No. 5,567,664) and methods for the production of zeolite membranes on porous supports (U.S. Pat. No. 5,362,522). Barri et al. state that any type of zeolite-type material may be used, including silicoaluminophosphates.

SAPO-34 membranes on porous supports have been reported in the scientific literature. Lixiong et al. (Stud. Surf. Sci. Catl., 1997, 105, p 2211) reported synthesis of a SAPO-34 membrane on one side of a porous α-Al$_2$O$_3$ disk by immersing the substrate surface in a hydrogel and heating the substrate and gel. Lixiong et al. reported single gas permeances for H$_2$, N$_2$, CO$_2$, and n-C$_4$H$_{10}$. Poshuta et al. (Ind. Eng. Chem. Res., 1998, 37, 3924-3929; AIChE Journal, 2000, 46(4), 779-789) reported hydrothermal synthesis of SAPO-34 membranes on the inside surface of asymmetric, porous α-Al$_2$O$_3$ tubes. Poshuta et al. (supra) reported single gas and mixture permeances and ideal and mixture selectivities for several gases, including CO$_2$ and CH$_4$. The CO$_2$/CH$_4$ selectivities reported for a 50/50 CO$_2$/CH$_4$ mixture at 300 K were between 14 and 36 for a feed pressure of 270 kPa and a pressure drop of 138 kPa (Poshusta et al., AIChE Journal, 2000, 46(4), pp 779-789). The CO$_2$/CH$_4$ selectivity was attributed to both competitive absorption (at lower temperatures) and differences in diffusivity. Li et al. reported an average CO$_2$/CH$_4$ selectivity of 76+/−19 for a 50/50 CO$_2$/CH$_4$ mixture at 295 K with a feed pressure of 222 kPa and a pressure drop of 138 kPa. The average CO$_2$ permeance was $(2.3+/-0.2) \times 10^{-7}$ mol/(m$^2$sPa) and the average CH$_4$ permeance was $(3.1+/-0.8) \times 10^{-9}$ mol/(m$^2$sPa). (Li, S. et al, Ind. Eng. Chem. Res. 2005, 44, 3220-3228. U.S. Patent Application Publication 2005-0204916-A1 to Li et al. reports CO$_2$/CH$_4$ separation selectivities of 67-93 for a 50/50 CO$_2$/CH$_4$ mixture at 297 K with a feed pressure of 222 kPa and a pressure drop of 138 kPa.

Several U.S. Patents report processes for the manufacture of molecular sieve layers on a support which involve depositing or forming molecular sieve crystals on the support prior to an in situ synthesis step. U.S. Pat. No. 6,090,289 to Verduijn et al. reports a process which involves forming an intermediate layer by applying molecular sieve crystals to the support or forming such crystals on the support then contacting the resulting coated support with a molecular sieve synthesis mixture and subjecting the mixture to hydrothermal treatment in order to deposit an upper layer comprising a crystalline molecular sieve of crystals having at least one dimension greater than the dimensions of the crystals of the intermediate layer. U.S. Pat. No. 6,177,373 to Sterte et al. reports a process which involves depositing on a substrate a monolayer comprising molecular sieve monocrystals which are capable of nucleating the growth of a molecular sieve film, forming a molecular sieve synthesis solution, contacting the monolayer and the synthesis solution and hydrothermally growing molecular sieve to form a molecular sieve film on the substrate. U.S. Pat. No. 5,871,650 to Lai et al. reports a process for preparing a zeolite membrane exhibiting a columnar cross-sectional morphology.

There remains a need in the art for improved methods for making SAPO membranes, in particular SAPO membranes with improved separation selectivities.

BRIEF SUMMARY OF THE INVENTION

In an embodiment, the invention provides methods for making crystalline silicoaluminophosphate (SAPO) membranes on a porous support, in particular SAPO-34 membranes. Inorganic membranes such as SAPOs can have superior thermal, mechanical and chemical stability, good erosion resistance, and high pressure stability as compared to conventional polymeric membranes.

The methods of the invention are capable of producing SAPO-34 membranes with improved CO$_2$/CH$_4$ selectivities as compared to separation selectivities previously reported for SAPO-34 membranes. For example, the membranes of the invention can have a CO$_2$/CH$_4$ selectivity greater than 100 for a 50/50 CO$_2$/CH$_4$ mixture at 295 K with a feed pressure of 222 kPa and a pressure drop of 138 kPa. In addition, the SAPO-34 membranes of the invention can have CO$_2$/CH$_4$ separation selectivities greater than 80 for trans-membrane pressure drops in excess of 6 MPa. The separation of CO$_2$ from CH$_4$ is important in natural gas processing because CO$_2$ reduces the energy content of natural gas.

In an embodiment, the membranes of the invention are made from synthesis gel compositions with a Si/Al ratio which is less than 0.3. However, the Si/Al ratio of the synthesis gel is selected to be greater than that at which mixtures of SAPO-34 and SAPO-5 form. In an embodiment, the Si/Al ratio of the synthesis gel is between 0.2 and 0.15.

In an embodiment, the invention provides a method for making a crystalline silicoaluminophosphate-34 (SAPO-34) membrane, the method comprising the steps of:
a) providing a porous support having a pore size greater than about 0.1 micron;
b) preparing an aqueous SAPO-34 forming gel comprising an organic templating agent;
c) aging the gel;
d) contacting the porous support with the aged gel;
e) heating the porous support and the gel to form a layer of SAPO-34 crystals on the surface of the support; and
f) calcining the SAPO-34 layer to remove the templating agent, wherein the gel comprises aluminum, phosphorus, silicon, oxygen, a templating agent and water, the gel has a ratio of silicon to aluminum between 0.3 and 0.15 and during step e) said support and said gel are heated to a temperature between about 453 and about 533 K.

Aging of the gel may take place before and/or after the gel and the support are placed in contact. In another embodiment, the invention provides a method for making a crystalline SAPO-34 membrane, the method comprising the steps of:
a) providing a porous support having a pore size greater than about 0.1 micron
b) preparing an aqueous SAPO-34 forming gel comprising an organic templating agent;
c) aging the gel;
d) contacting the porous support with the gel;
e) heating the porous support and the aged gel to form a layer of SAPO-34 crystals on the surface of the support; and
f) calcining the SAPO-34 layer to remove the templating agent, wherein the gel comprises aluminum, phosphorus, silicon, oxygen, a templating agent and water, the gel has a ratio of silicon to aluminum greater than 0.1 and less than or equal to 0.6 and during step e) said support and said gel are heated to a temperature between about 453 K and about 533 K.

In another embodiment, the membranes of the invention are made using a technique in which SAPO-34 crystals are applied to the support surface (by a method other than in-situ hydrothermal synthesis) prior to in situ hydrothermal synthesis. Use of this technique can allow thinner membranes to be made, thereby increasing the permeance of the membrane. The methods of the invention are capable of producing SAPO-34 membranes with improved permeances of $CO_2$ in combination with high $CO_2/CH_4$ selectivities. In an embodiment, the permeance of $CO_2$ is greater than $3 \times 10^{-7}$ mol/(m² S Pa) for a 50/50 $CO_2/CH_4$ mixture at 295 K with a feed pressure of 222 kPa and a pressure drop of 138 kPa.

In an embodiment, the invention provides a method for making a crystalline silicoaluminophosphate-34 (SAPO-34) membrane, the method comprising the steps of:
a) providing a porous support;
b) applying a first quantity of SAPO-34 crystalline material to at least part of the surface of the porous support prior to step e), wherein the first quantity of crystalline material is in the form of SAPO-34 crystals;
c) preparing an aqueous SAPO-34 forming gel comprising an organic templating agent;
d) contacting the porous support with the gel;
e) heating the porous support and the gel to form a second quantity of SAPO-34 crystalline material on the support, thereby forming a cumulative layer of SAPO-34 crystals on the surface of the support; and
f) calcining the SAPO-34 layer to remove the templating agent, wherein the gel comprises aluminum, phosphorus, silicon, oxygen, a templating agent and water, with the ratio of silicon to aluminum being between 0.3 and 0.15 and during step e) said support and said gel are heated to a temperature between about 453 K and about 533 K.

The invention also provides supported SAPO membranes. In an embodiment, the invention provides a supported membrane comprising a porous support and SAPO crystals which form a layer on one side of the support. SAPO crystals may also be present within at least some of the pores of the support. In another embodiment, the porous support is in the form of a tube and the SAPO crystals form a layer on either the inside and the outside of the tube. In an embodiment, the thickness of the membrane is less than 5 microns.

The invention also provides methods for separating a first gas component from a gas mixture including at least a first and a second gas component. In an embodiment, the method comprises the steps of:
a) providing a membrane of the invention, the membrane having a feed and a permeate side and being selectively permeable to the first gas component over the second gas component;
b) applying a feed stream including the first and the second gas components to the feed side of the membrane; and
c) providing a driving force sufficient for permeation of the first gas component through the membrane, thereby producing a permeate stream enriched in the first gas component from the permeate side of the membrane.

In an embodiment, the first gas component is carbon dioxide and the second gas component is methane.

DETAILED DESCRIPTION OF THE INVENTION

Figure 1:
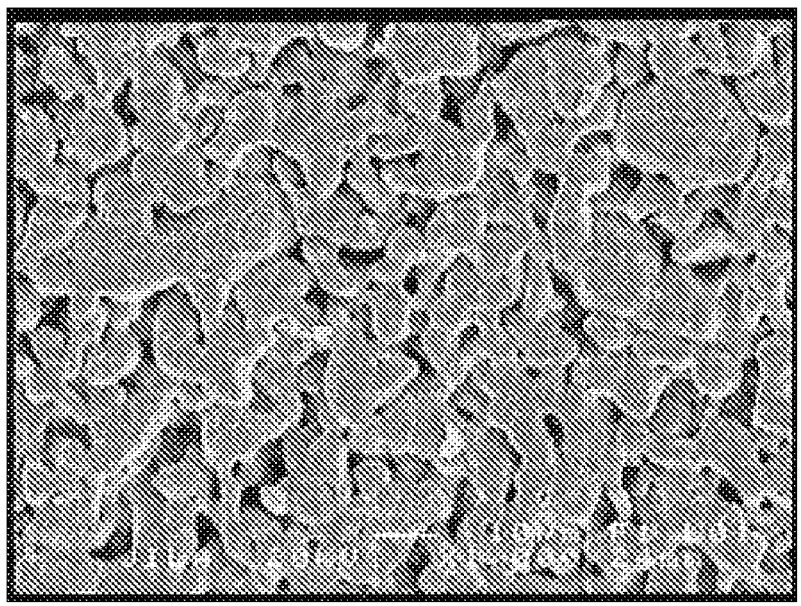
FIG. 1 is scanning electron microscope (SEM) image of a stainless steel support surface prior to application of SAPO-34 crystals.

In an embodiment, the methods of the invention provide silicoaluminophosphate 34 (SAPO-34) membranes formed of SAPO crystals. SAPOs are zeolite-type molecular sieve materials, having a crystal structure of tetrahedra joined together through oxygen atoms to produce an extended network of channels of molecular dimensions. The SAPO crystals have a three-dimensional crystal framework structure of $PO_2^+$, $AlO_2^-$ and $SiO_2$ tetrahedral units, the framework structure defining a structure of regular cages, cavities, and channels. The dimensions of these channels and cavities are generally microporous. As used herein, "microporous" refers to pore diameters less than about 2 nanometers.

Crystalline SAPO-34 has the CHA structure and is an analog of the natural zeolite chabazite. The CHA framework structure contains single eight ring, double six ring, and single four ring secondary building units. SAPO-34 adsorption measurements have determined that n-$C_4H_{10}$ (0.43 nm diameter) can fit the pores, but i-$C_4H_{10}$ (0.5 nm) diameter cannot, thus the pore size is believed to be between 0.43 and 0.5 nm (Lok et al., in Lok. et al. (eds.) Crystalline Silicoalumino Phosphates, US, 1984).

Other SAPOs have different structures and different pore sizes. SAPOs and other molecular sieves can be classified as small, medium, or large-pore molecular sieves based on the size of the largest oxygen rings in the structure. Crystalline SAPO-5 has the AFI structure which contains rings of 12 oxygen atoms, 6 oxygen atoms, and 4 oxygen atoms. SAPO-5 is typically considered a large-pore molecular sieve. In contrast, crystalline SAPO-11 has the AEL structure which contains rings of 10 oxygen atoms, 6 oxygen atoms, and 4 oxygen atoms. SAPO-11 is typically considered a medium-pore molecular sieve. Structures where the largest ring contains 8 or fewer oxygen atoms are typically considered small-pore molecular sieves. Further information regarding SAPO structures is available in Baerlocher, W. M. Meier and D. H. Olson, "Atlas of Zeolite Framework Types", 5th ed., Elsevier: Amsterdam, 2001 and online at http://www.iza-strucures.org/databases.

In an embodiment, the silicoaluminophosphates formed by the methods of the invention have the framework composition $(Si_xAl_yP_z)O_2$ where x is between about 0.01 and about 0.98,
y is between about 0.01 and about 0.60, and
z is between about 0.01 and about 0.52.

In another embodiment, monovalent Li; divalent Be, Mg, Co, Fe, Mn, and Zn; trivalent B, Ga, and Fe; tetravalent Ge and Ti; pentavalent As, or combinations thereof may be substituted into the SAPO framework structure.

Silicoaluminophosphates exhibit cation exchange properties. The excess negative charge in the lattice may be compensated by protons or by compensating cations located in the cavities of the structural framework. Acid hydrogen forms of SAPOs (e.g. H-SAPO-34) have protons that are loosely attached to their framework structure in lieu of inorganic compensating cations. Other forms of SAPO-34 include, but are not limited to Na-SAPO-34, Cu-SAPO-34, Li-SAPO-34, K-SAPO-34, Rb-SAPO-34, and Ca-SAPO-34. These may be made through ion-exchange of H-SAPO-34 or by including the appropriate cation in the synthesis gel.

The membranes of the invention are formed through in-situ crystallization of an aqueous silicoaluminophosphate-forming gel. The gel contains an organic templating agent. The term "templating agent" or "template" is a term of art and refers to a species added to the synthesis media to aid in and/or guide the polymerization and/or organization of the building blocks that form the crystal framework. Gels for forming SAPO crystals are known to the art, but preferred gel compositions for forming membranes may differ from preferred compositions for forming loose crystals or granules.

The preferred gel composition may vary depending upon the desired crystallization temperature and time.

In an embodiment, the gel is prepared by mixing sources of aluminum, phosphorus, silicon, and oxygen in the presence of a templating agent and water. In an embodiment, the gel comprises Al, P, Si, O, a templating agent and water. The composition of the mixture may be expressed in terms of the following molar ratios as: $1.0\, Al_2O_3{:}aP_2O_5{:}bSiO_2{:}cR{:}dH_2O$, where R is a templating agent. In an embodiment, R is a quaternary ammonium templating agent. In an embodiment, the quaternary ammonium templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, or combinations thereof. In an embodiment, suitable for crystallization between about 420 K and about 540 K, a is between about 0.01 and about 52, b is between about 0.03 and about 196, c is between about 0.2 and about 5 and d is between about 20 and about 300. If other elements are to be substituted into the structural framework of the SAPO, the gel composition can also include $Li_2O$, BeO, MgO, CoO, FeO, MnO, ZnO, $B_2O_3$, $Ga_2O_3$, $Fe_2O_3$, GeO, TiO, $As_2O_5$ or combinations thereof. If compensating cations are to be included in the cavities of the structural framework, the gel composition can also include sources of the compensating cations (for example, NaOH for $Na^+$, LiOH for $Li^+$, KOH for $K^+$, RbOH for Rb+, and CsOH for $Cs^+$)

In an embodiment suitable for crystallization of SAPO-34, c is less than about 2. In an embodiment suitable for crystallization of SAPO-34 at 453 K to 533 K for 20-24 hours, a is about 1, b is 0.03-0.6, c is 1.07-1.2 and d is 55-56. In other embodiments, the ratio of silicon to aluminum is between 0.3 and 0.15, is between 0.2 and 0.15, and is 0.15. In an embodiment, R is a quaternary organic ammonium templating agent selected from the group consisting of tetrapropyl ammonium hydroxide, tetraethyl ammonium hydroxide (TEAOH), or combinations thereof.

One important gel composition parameter is the ratio of Si to Al. In an embodiment, the ratio of Si to Al is high enough so that $AlPO_5$ is not formed. In different embodiments, the ratio of silicon to aluminum is greater than 0.1, greater than 0.10 and less than or equal to 0.6, between 0.10 and 0.6, between 0.15 and 0.45, from 0.15 to 0.3, between 0.15 and 0.3, from 0.15 to 0.2, or is about 0.15.

In an embodiment suitable for crystallization of SAPO-5 at about 460 K for about 24 hours, a is about 1.0, b is about 0.4, c is about 2.0, and d is about 50. In an embodiment, R is a tripropylamine template (Gump, C. et al, Ind. Engr. Chem. Res, 2001, 40(2), 565-577).

In an embodiment, the gel is prepared by mixing sources of phosphate and alumina with water for several hours before adding the template. The mixture is then stirred before adding the source of silica. In an embodiment, the source of phosphate is phosphoric acid. Suitable phosphate sources also include organic phosphates such as triethyl phosphate, and crystalline or amorphous aluminophosphates. In an embodiment, the source of alumina is an aluminum alkoxide, such as aluminum isopropoxide. Suitable alumina sources also include pseudoboehmite and crystalline or amorphous aluminophosphates (gibbsite, sodium aluminate, aluminum trichloride). In an embodiment, the source of silica is a silica sol. Suitable silica sources also include fumed silica, reactive solid amorphous precipitated silica, silica gel, alkoxides of silicon (silicic acid or alkali metal silicate).

Na-SAPO-34 can be made by incorporating NaOH into the synthesis gel. In an embodiment, the gel composition can be expressed by: $Al_2O_3$: $aP_2O_5$: $bSiO_2$: $eNa_2O$: cR: $dH_2O$. In an embodiment, a is 0.77, b is 0.46, e is 0.23, c is 0.77, and d is 46.

In an embodiment, the gel is aged prior to use. As used herein, an "aged" gel is a gel that is held (not used) for a specific period of time after all the components of the gel are mixed together or a gel that is maintained at a temperature below the membrane synthesis temperature for a specific period of time after all the components are mixed. In an embodiment, the gel is sealed and stirred during storage to prevent settling and the formation of a solid cake. Without wishing to be bound by any particular theory, it is believed that aging of the gel affects subsequent crystallization of the gel by generating nucleation sites. In general, it is believed that longer aging times lead to formation of more nucleation sites. The preferred aging time will depend upon the aging temperature selected. Preferably, crystal precipitation is not observed during the aging period. In an embodiment, the viscosity of the aged gel is such that the gel is capable of penetrating the pores of the porous support. After initial mixing of the components of the synthesis gel in a container, material can settle to the bottom of the container. In an embodiment, the gel is stirred and aged until no settled material is visible at the bottom of the container and the gel appears translucent and substantially uniform to the eye. In different embodiments, the aging time is greater than two hours, greater than five hours, greater than ten hours, or greater than twenty four hours. In different embodiments, the aging time at room temperature is at least about twenty-four hours, greater than about twenty-four hours, at least about forty-eight hours, and at least about seventy-two hours. For SAPO-34 membranes, in different embodiments the aging time at room temperature or above can be at least twenty four hours, greater than about twenty-four hours at least about forty-eight hours, at least about seventy-two hours, between about three days and about seven days or between four days and 28 days. In an embodiment, the gel is not aged longer than one month. In different embodiments, the aging temperature is between 10° C. and 75° C. or between 25° C. and 60° C. In different embodiments, the aging time is at least 24 hours between 290 K and 350 K, between 290 K and 335 K, or between 290 K and 300 K. Aging of the gel may take place before the gel and the support are placed in contact. In another embodiment, the gel may be aged by placing the gel and the support in contact and holding the gel and the support at a temperature below the synthesis temperature for the desired amount of time. The same batch of gel may be used for all the crystallization steps, so long as the upper limit of the aging time is not exceeded. Alternately, more than one batch of gel may be prepared and aged, with different batches being used for one or more crystallization step(s). In an embodiment, each crystallization step may use a different batch of gel. The aging time of different batches of gel at the time of use may be the same or may be different.

In other embodiments, aging of the gel is not required to obtain the desired quality of membrane. For example, gel aging may not be required if SAPO-34 crystals are applied to the support prior to in situ synthesis. In addition, gel aging may not be required for certain types of silica sources. In an embodiment, aging is not required if tetraethyl orthosilicate (TEOS) is used as the silica source.

The gel is brought into contact with at least one surface of the porous support. If the SAPO-34 crystals have been applied to at least part of the surface of the support, the gel is brought into contact with at least this part of the surface. In an embodiment, the porous support has two sides (e.g. the inside and outside of a tube or the top or bottom of a plate or disk) and the gel is brought into contact with only one side of the support. One side of the support may be masked to limit its contact with the gel. Suitable masking techniques are known to the art. One known masking technique involves covering the surface with a polymer layer, for example covering it with fluoropolymer tape. Another masking technique involves infiltrating the pores of the support with an organic masking agent, such as a polymer or a wax, which can later be removed through thermal treatment. In another embodiment, the porous support may be immersed in the gel so that more than one surface of the porous support contacts the gel. In an embodiment, at least some of the gel penetrates the pores of the support. The pores of the support need not be completely filled with gel. In an embodiment, the porous support is brought into contact with a sufficient quantity of gel such that growth of the SAPO membrane is not substantially limited by the amount of gel available.

The porous support is a body capable of supporting the SAPO membrane. The porous support may be of any suitable shape, including disks and tubes. In an embodiment, the porous support is in the form of a tube. In an embodiment, the porous support is a metal or an inorganic material. In an embodiment, the porous support does not appreciably dissolve or form reaction products at the interface when placed in contact with the synthesis gel. Suitable inorganic porous supports include, but are not limited to, α-alumina, glass, titania, zirconia, carbon, silicon carbide, clays or silicate minerals, aerogels, supported aerogels, and supported silica, titania and zirconia. Suitable porous metal supports include, but are not limited to, stainless steel, nickel based alloys (Inconel, Hastalloy), Fecralloy, chromium and titanium. The metal may be in the form of a fibrous mesh (woven or non-woven), a combination of fibrous metal with sintered metal particles, and sintered metal particles. In an embodiment, the metal support is formed of sintered metal particles.

In an embodiment, the pore diameter of the support is large enough to allow the synthesis gel to penetrate the support. When SAPO-34 crystals are applied to the surface of the support prior to in situ synthesis, the pore size of the support can be smaller than, equal to, or greater than the characteristic pore size of the particles. Often, a porous support will have a distribution of pore sizes. Preferably, the pore diameter of the support is greater than about 0.1 microns. The pore diameter of the support being greater than about 0.1 microns does not require that every single pore in the support is greater than about 0.1 microns, but it does exclude supports having regions where the characteristic pore size is about 0.1 microns (for example, a support having a layer with an 0.1 micron average pore size). The characteristic pore size may be taken as the average, median or largest pore size. In different embodiments, the pore size of the support is greater than or equal to about 50 nm, between about 0.1 microns and about 6 microns, between about 0.2 and about 6 microns, between about 0.5 and about 6 microns, between about 1 micron and about 6 microns, between about 2 and about 6 microns, or about 4 microns. The characteristic pore size of the support may be assessed by several methods including microscopy techniques and mercury porosimetry. The porous support may be joined to nonporous material which provides a sealing surface for use of the membrane. This nonporous material may also be immersed in or partially covered with synthesis gel during the synthesis process, in which case SAPO crystals may form on the nonporous material as well.

In an embodiment, the porous support is cleaned prior to being brought into contact with the synthesis gel. The support may be cleaned by being boiled in purified water. After cleaning with water, the support may then be dried.

In an embodiment, a first quantity of SAPO-34 crystalline material in the form of loose SAPO-34 crystals is applied to at least part of the surface of the porous support prior to bringing the support in contact with the synthesis gel. As used herein, the term "loose crystals" refers to crystals which are largely unagglomerated or interlocking, in contrast to the interlocking crystals formed during in-situ synthesis of the membrane. As used herein, the surface of the support can include both non-porous portions and porous portions where the pores of the support open to the surface. In the present invention crystals can be applied to the surface by contacting crystals with the surface or with crystals already associated with the surface. Since the surface has porous and non-porous portions, contacting the crystals with the surface can include contacting crystals with non-porous portions of the surface or lodging crystals wholly or partially within the pores which open to the surface. The crystals may also be applied to the surface by using coupling agents to form covalent linkages between the crystals and the support surface. In an embodiment, the support is treated with a barrier layer to prevent the crystals from preferentially entering the pores of the support as described in U.S. Pat. No. 6,090,289. In another embodiment, no barrier layer is used. When no barrier layer is used and the crystals are small enough so that some of the crystals lodge within the pores of the support, the crystals need not form a continuous or nearly continuous layer over the non-porous portions of the support surface. In an embodiment, the average amount of particles applied is 0.4 g/m$^2$-0.6 g m$^2$, where this value is calculated as the weight of crystals applied divided by the approximate surface area over which the particles are applied.

The crystals may be applied in dry form. For example, various types of brushes or other applicators may be used to apply the crystals. The crystals may be rubbed onto the surface of the support. In an embodiment where a stainless steel support is used, sufficient crystals are rubbed onto the surface of the support that the support appears uniformly white to the eye.

The crystals may also be suspended in solution and the solution applied to the support surface. A variety of techniques are known to the art for applying solutions of colloidal particles including, but not limited to, spin-coating, wash-coating, spray-coating, brushing, slip-casting, dip coating, and immersion for longer periods of time than those used in dip coating.

The support surface may also be treated to impart a surface charge suitable for adsorption of SAPO-34 particles in solution. For example, if the SAPO-34 crystals are dispersed in an alkaline aqueous suspension the crystals are expected to have a negative surface charge. Modification of the surface of the support to impart a positive surface charge results in attraction between the particles and the surface. Modification of support surfaces using cationic polymers to enable adsorption of molecular sieve microcrystals is discussed in U.S. Pat. No. 6,177,373 to Sterte et al. Application of this technique to form silicalite-1 seed layers has been reported by Hedlund et al. (Hedlund, J. et al., 2002, Microporous and Mesoporous Materials, 179-189).

A coupling agent can also be used to attach SAPO-34 particles to the support surface. For example, silane coupling agents can be used to form a covalent linkage between the particles and silanol groups on the surface of the support. Use of coupling agents to form more or less complete zeolite microcrystal monolayers is discussed in U.S. Pat. No. 6,177,373 to Sterte et al.

The size of the crystals applied to the support surface can vary. If it is desired that these crystals penetrate the pores of the support, the size of the crystals is selected accordingly. Packing of the crystals into the pores of the support may limit later penetration of the synthesis gel into the support. If it is desired that the crystals form a stable dispersion or solution of discrete particles, colloidal sized crystals are selected. In an embodiment, the colloidal sized particles are between about 2.5 nm and about 1000 nm. In different embodiments, the size of the crystals applied to the support is between about 50 nm and about 1000 nm, between about 100 nm and about 1000 nm or between about 50 nm and about 500 nm.

The crystals applied to the support surface may be synthesized from a gel having the substantially the same composition as that used to prepare the membranes. However, the calcination temperature used after synthesis may be higher than that used for the membranes.

Without wishing to be bound by any particular belief, it is believed that in some embodiments of the invention some of the crystals applied to the support act as crystallization nuclei for the synthesis mixture during hydrothermal treatment. Crystals that act as crystallization nuclei can be referred to as "seed crystals". It is believed that during the hydrothermal treatment the seed crystals grow in size.

After the porous support and the aged gel are brought into contact, the support and gel are heated in a SAPO crystal synthesis step. This synthesis step can lead to formation of SAPO crystalline material on and in the porous support. As used herein, crystalline material includes both newly formed crystals and crystalline material grown on previously formed crystals. If SAPO crystals have been applied to the support prior to the synthesis step, the synthesis step results in the formation of a second quantity of crystalline material which may take the form of new crystals and/or growth of the applied crystals. During each synthesis step a layer of SAPO crystals can be said to form on the surface of the porous support and/or on previously formed SAPO crystals. The layer of SAPO crystals formed during each synthesis step may not be continuous. During the synthesis step, crystals may also precipitate from the synthesis gel without being incorporated into the SAPO membrane. In an embodiment, the synthesis temperature is between about 420K and about 540 K. In different embodiments, the synthesis temperature is between about 453 K and about 553 K, or between about 470 K and about 515 K. In an embodiment, the crystallization time is between about 15 and about 25 hours. In a different embodiment, the crystallization time is about 20-25 hours. Synthesis typically occurs under autogenous pressure.

In an embodiment, excess synthesis gel is removed from the support and the SAPO crystals after each synthesis step. The excess gel may be removed by washing with water. After washing with water, the support and SAPO crystals may then be dried.

In an embodiment, the synthesis step may be repeated in order to form a greater amount of SAPO crystals. After each synthesis step, the excess synthesis gel is removed and then the porous support is brought into contact with synthesis gel before performing the next synthesis step. Sufficient synthesis steps are performed so that the cumulative layer formed on the support surface by the synthesis steps and any crystal application steps forms a continuous layer. The SAPO membrane is formed by the cumulative layer(s) of SAPO crystals on the support surface(s) and the (interconnected) SAPO crystals formed inside the porous support. In an embodiment, the SAPO crystals inside the support are substantially interconnected. In an embodiment, the interconnected SAPO crystals are connected to the layers of SAPO crystals formed on the support surface. In an embodiment, sufficient synthesis steps are performed that the membrane is impermeable to nitrogen after preparation (but before calcination).

When SAPO-34 crystals are applied to the support prior to in situ synthesis, fewer synthesis steps may be required to form a good quality membrane than when no SAPO-34 crystals are applied. Three or four synthesis steps can produce acceptable results when no SAPO-34 crystals are applied. Two synthesis steps can produce acceptable results otherwise.

After SAPO crystal synthesis is complete, the SAPO membranes are calcined to substantially remove the organic template material. After calcination, the membrane becomes a semi-permeable barrier between two phases that is capable of restricting the movement of molecules across it in a very specific manner. In different embodiments, the calcination temperature is between about 600 K and about 900 K, and between about 623 K and about 773 K. For membranes made using TEAOH and TPAOH as a templating agent, the calcining temperature can be between about 623 K and about 673 K. In an embodiment, the calcination time is between about 5 hours and about 25 hours. Longer times may be required at lower temperatures in order to substantially remove the template material. Use of lower calcining temperatures can reduce the formation of calcining-related defects in the membrane. The heating rate during calcination should be slow enough to limit formation of defects such as cracks. In an embodiment, the heating rate is less than about 2.0 K/min. In a different embodiment, the heating rate is about 0.6 K/min. Similarly, the cooling rate must be sufficiently slow to limit membrane defect formation. In an embodiment, the cooling rate is less than about 2.0 K/min. In a different embodiment, the cooling rate is about 0.9 K/min.

In an embodiment, the SAPO membranes of the present invention comprise SAPO crystals which form a layer on at least one side of the porous support. SAPO crystals may also be present within at least some of the pores of the support. The thickness of the SAPO layer depends in part on the number of synthesis steps performed. In embodiment where synthesis steps are performed until the membrane is impermeable to nitrogen, the thickness of the cumulative SAPO layer is less than about 20 microns. When the layer thicknesses are measured from cross-sections with scanning electron microscopy, the uncertainty in the thickness measurement is believed to be on the order of +/−10%. In other embodiments, the thickness of the SAPO layer is about 5 microns, less than 5 microns or about 2.5 microns. In an embodiment, immersion of a porous support in the synthesis gel can lead to formation of SAPO crystals within the support as well as on both sides of the support. For example, immersion of a porous tube in the synthesis gel can lead to formation of SAPO crystals within the tube as well as formation of a SAPO layer on the inside and the outside of the tube. In an embodiment, the SAPO crystals may form throughout the thickness of the support. When both sides of the support are immersed and capable of being penetrated by the gel, formation of SAPO crystals throughout the thickness of the support indicates that the synthesis gel has penetrated to the center of the support. However, formation of SAPO crystals throughout the support does not require that SAPO crystals completely fill the pore space of the support.

Transport of gases through a zeolite-type membrane can be described by several parameters. As used herein, the flux, $J_i$, through a membrane is the number of moles of a specified component i passing per unit time through a unit of membrane surface area normal to the thickness direction. The permeance or pressure normalized flux, $P_i$, is the flux of component i per unit transmembrane driving force. For a diffusion process, the transmembrane driving force is the gradient in chemical potential for the component (Kärger, J. Ruthven, D. M., Diffusion in Zeolites, John Wiley and Sons: New York, 1992, pp. 9-10). The selectivity of a membrane for components i over j, $S_{i/j}$ is the permeance of component i divided by the permeance of component j. The ideal selectivity is the ratio of the permeances obtained from single gas permeation experiments. The actual selectivity (also called separation selectivity) for a gas mixture may differ from the ideal selectivity.

Transport of gases through zeolite pores can be influenced by several factors. As used herein, "zeolite pores" are pores formed by the crystal framework of a zeolite-type material. A model proposed by Keizer et al. (J. Memb. Sci., 1998, 147, p. 159) has previously been applied to SAPO-34 membranes (Poshusta et al., AIChE Journal, 2000, 46(4), pp 779-789). This model states that both molecular sizes relative to the zeolite pore and the relative adsorption strengths determine the faster permeating species in a binary mixture. This gives rise to three separation regimes where both components are able to diffuse through the molecular sieve pores. In the first region, both molecules have similar adsorption strengths, but one is larger and its diffusion is restricted due to pore walls. In the first region, the membrane is selective for the smaller molecule. In region 2, both molecules have similar kinetic diameters, but one adsorbs more strongly. In region 2, the membrane is selective for the strongly adsorbing molecule. In region 3, the molecules have significantly different diameters and adsorption strengths. The effects of each mechanism may combine to enhance separation or compete to reduce the selectivity.

In an embodiment, the SAPO-34 membranes of the invention have room-temperature $CO_2/CH_4$ separation selectivities greater than about 100 for an approximately 50/50 $CO_2/CH_4$ mixture with about 222 kPa feed pressure and about 138 kPa pressure drop.

In industrial gas separation processes, the pressure drop across the membrane can be several MPa. For example, in the natural gas separation industry, the trans-membrane pressure drop is about 6 MPa. Therefore, the membrane separation selectivity for trans-membrane pressure differentials in the MPa range can be very important. In an embodiment, the $CO_2/CH_4$ separation selectivity of the SAPO-34 membranes of the invention is greater than about 100 at a temperature of about 298 K for an approximately 50/50 $CO_2/CH_4$ mixture with about 7 MPa pressure drop In natural gas separation, the methane loss in the permeate should be reduced as low as possible. That is, high $CO_2$ permeate concentration is an important parameter. In an embodiment, the $CO_2$/permeate concentration is greater than about 98.9% for the SAPO-34 membranes of the invention at a temperature of about 298 K for an approximately 50/50 $CO_2/CH_4$ mixture with about 7 MPa pressure drop.

Transport of gases through a crystalline zeolite-type material such as a SAPO membrane can also be influenced by any "nonzeolite pores" in the membrane structure. "Nonzeolite pores" are pores not formed by the crystal framework. Intercrystalline pores are an example of nonzeolite pores. The contribution of nonzeolite pores to the flux of gas through a zeolite-type membrane depends on the number, size and selectivity of these pores. If the nonzeolite pores are sufficiently large, transport through the membrane can occur through Knudsen diffusion or viscous flow. For some SAPO-34 membranes, membranes with more nonzeolite pores have been shown to have lower $CO_2/CH_4$ selectivities (Poshusta et al., AIChE Journal, 2000, 46(4), pp 779-789). As the pressure drop increases, any transport through viscous flow contributes more to the overall flux and thus can decrease the selectivity of the membrane. Therefore, membranes with fewer nonzeolite pores can have better separation selectivities at higher pressures.

The membranes of the invention can be selectively permeable to some gases over others. For example, the SAPO-34 membranes of the invention are selectively permeable to $CO_2$ over $CH_4$, especially at lower temperatures. Therefore, the invention provides a method for separating two gases in a feed stream including these two gas components using the membranes of the invention. The feed stream is applied to the feed side of the membrane, generating a retentate stream and a permeate stream. In order to separate the two gases, sufficient trans-membrane driving force must be applied that at least one of the gases permeates the membrane. In an embodiment, both gases permeate the membrane. If the membrane is selectively permeable to a first gas component over a second gas component, the permeate stream will be enriched in the first gas component while the retentate stream will be depleted in the first component. The permeate stream being enriched in the first gas component implies that the concentration of the first gas component in the permeate stream is greater than its concentration in the feed stream. Similarly, the retentate stream being depleted in the first gas component implies that the concentration of the first gas component in the retentate stream is less than its concentration in the feed stream.

All references cited herein are incorporated by reference to the extent not inconsistent with the disclosure herein.

When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

In general the terms and phrases used herein have their art-recognized meaning, which can be found by reference to standard texts, journal references and contexts known to those skilled in the art. The preceding definitions are provided to clarify their specific use in the context of the invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Those of ordinary skill in the art will appreciate that the SAPO membranes of the invention may be made using starting materials other than those specifically disclosed herein and that procedures and techniques functionally equivalent to those described herein can be employed to make, assess, and use the SAPO membranes described herein.

EXAMPLES

Example 1

Preparation of SAPO-34 Membranes

SAPO-34 membranes were prepared on porous stainless steel tubes (Pall Corporation Item# 2230336, part # 7EC4910-111SC008, pore size characterized as both approximately 4 microns and 0.8 microns, depending on the characterization method). These tubes had a length of approximately 30 mm, an inner diameter of approximately 7.2 mm and an outer diameter of approximately 9.5 mm. Non-porous, stainless steel tubes were welded onto each end of the stainless steel support to prevent membrane bypass and to provide a sealing surface for o-rings. The combined length of the combined porous and dense tube assembly was approximately 59 mm. The permeate area was approximately 7.8 $cm^2$. Before synthesis, the tube assembly was boiled in purified water for 3 h and dried at 373 K under vacuum for 30 min.

The synthesis gel had the approximate molar composition: $Al_2O_3$: $P_2O_5$ b$SiO_2$: 1.2 TEAOH: 55$H_2O$, and was prepared by stirring $H_3PO_4$ (85 wt % aqueous solution), Al(i-$C_3H_7O)_3$ (>99.99%, Aldrich), and $H_2O$ at room temperature for 12 h. Four different Si/Al ratios were used: 0.3, 0.2, 0.15 and 0.1. Then the template, tetra-ethyl ammonium hydroxide (TEAOH, 35 wt % aqueous solution, Aldrich), was added, and the mixture was stirred for 30 min before the colloidal silica sol (Ludox AS40, 40% aqueous solution) was added. The solution was sealed and stirred during storage to prevent settling and the formation of a solid cake. The gel was aged for at least 24 hours at room temperature before use.

The outside of the tube was wrapped in Teflon tape. The tube was then placed vertically in an autoclave and the autoclave was filled with synthesis gel.

The hydrothermal synthesis was carried at about 473 K for about 24 h. After synthesis, the membrane was washed with purified water at 297 K and dried at about 373 K in an oven for about 10 mins. A second synthesis layer was applied using the same procedure, but the tube was inverted to obtain a more uniform layer. The third and fourth synthesis layer (if used) were prepared using the same procedure as the first and second layers, except that a new batch of aged synthesis gel was used. Good quality membranes were prepared with 3-4 synthesis.

Membranes were impermeable to $N_2$ after preparation but before calcination. To remove the TEAOH template from the zeolite framework, membranes were calcined at about 663 K for about 10 h. The heating and cooling rates were about 0.6 and about 0.9 K/min, respectively.

The membranes with Si/Al ratios of 0.3, 0.2 and 0.15 had a CHA structure (SAPO-34). The membrane with a Si/Al ratio of 0.1 has a structure which was a mixture of CHA (SAPO-34) and AFI (SAPO-5).

A broken membrane with a Si/Al ratio of 0.15 made with four synthesis steps had a zeolite layer (measured by SEM) approximately 5 microns thick.

Example 2

Preparation of SAPO-34 Membranes with Application of SAPO-34 Crystals to the Support Prior to Thermal Synthesis The same support material was used as before. The particles applied to the support were prepared from a synthesis gel having the approximate molar composition: $Al_2O_3$: $P_2O_5$: $0.3SiO_2$: 1.2 TEAOH: $55H_2O$, prepared as described in Example 1. The hydrothermal synthesis was carried at about 473 K for about 24 h. The seed crystals were centrifuged to remove the larger crystals and then centrifuged again at a higher speed to collect the crystals for application to the support. The crystals were then washed with water and calcined at 823 K for about 10 h. The heating and cooling rates were about 0.6 and about 0.9 K/min, respectively. The size of the crystals collected was between 100 nm and 1000 nm based on Scanning Electron Microscope (SEM) analysis.

The inside surface of the support tube was rubbed with dry SAPO-34 particles (Si/Al=0.15) using an eyelash brush. The mass of the stainless steel tube increased by 0.0038 g. SEM microscopy was used to look at the surface of a portion of a support tube before and after application of the particles. FIG. 1 shows an SEM image of the support tube before application of the particles.

Figure 2:
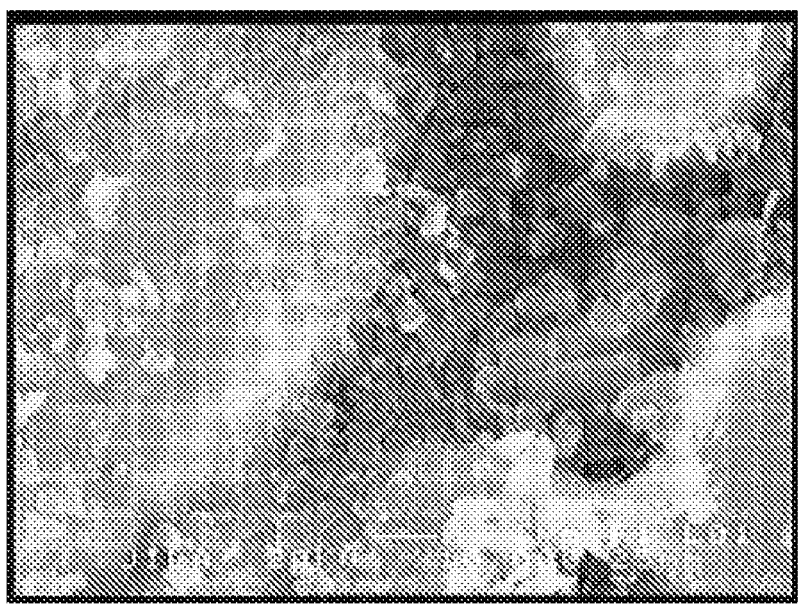
FIG. 2 is an SEM image of a stainless steel support surface following application of SAPO-34 crystals.

According to this picture, the largest pore size is on the order of 5 μm. FIG. 2 is an SEM image of a stainless steel support surface following application of SAPO-34 crystals. SAPO-34 zeolite crystals have filled in the pores of the support, but do not form a continuous layer over the nonporous portions of the surface. In FIG. 1, the scale marker length indicates 10 microns, while in FIG. 2 the scale marker length indicates 1 micron.

The synthesis gel had the approximate molar composition: $Al_2O_3$: $P_2O_5$:$0.3SiO_2$:$1.2$ TEAOH:$55H_2O$, and was prepared as described in Example 1.

The outside of the tube was wrapped in Teflon tape. The tube was then placed vertically in an autoclave and the autoclave was filled with synthesis gel.

The hydrothermal synthesis was carried at for about 24 h. Membranes were synthesized at 473 K, 493 K, 503 K, 513 K, and 533 K. The number of synthesis steps was between one and three, with the best transport results obtained for two synthesis steps. After each synthesis step, the membrane was washed with purified water at 297 K and dried at about 373 K in an oven for about 10 mins.

Figure 3:
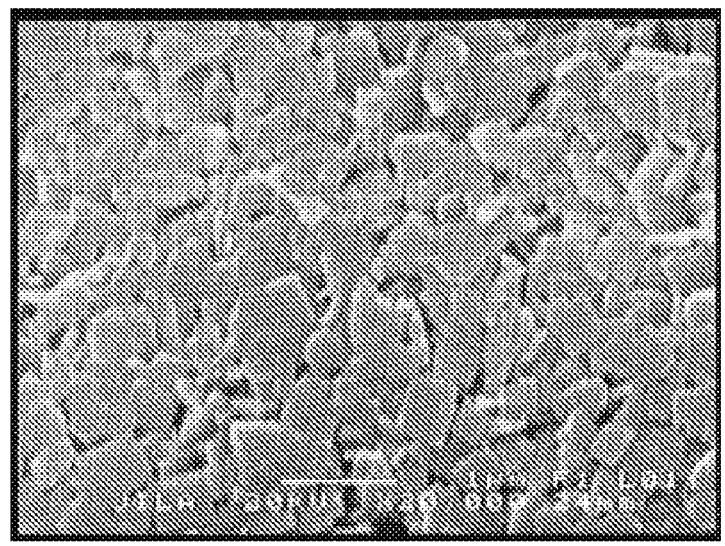
FIG. 3 shows an SEM image of the top of a SAPO-34 membrane prepared using two synthesis steps after applying SAPO-34 crystals to a stainless steel support. The synthesis temperature was 493 K.

FIG. 3 shows an SEM image of the top of a membrane prepared using two synthesis steps. The synthesis temperature was 493 K. The SAPO-34 zeolite crystals appear to be smaller than 500 nm. In FIG. 3, the scale marker length indicates 1 micron A broken membrane prepared with a synthesis temperature of 493 K and two synthesis steps had a zeolite layer (measured by SEM) approximately 2.5 micron thick.

Example 3

Preparation of a Na-SAPO Membrane

Na-SAPO-34 membranes were directly prepared by a gel composition $0.3Na_2O$:$1.3Al_2O_3$:$P_2O_5$:$0.6SiO_2$:$1TEAOH$:$60H_2O$. Four synthesis steps were performed, with each synthesis carried out at 473 K for 24 hours. SAPO-34 crystals were not applied to the support surface prior to the first synthesis step. The remainder of the synthesis procedure is similar to that of Example 1.

Example 4

Transport Properties for the SAPO-34 Membranes of Example 1

Single-gas and mixture permeation was measured on a system similar to that used by Poshusta et al. (Ind. Eng. Chem. Res., 1998, 37. p. 3924), but modified for the study of light gases at pressure drop as high as 7 MPa. The membranes were mounted in a stainless-steel module, and sealed at each end with silicone O-rings. Fluxes were measured using a soap-film bubble flowmeter and a stopwatch. The lowest measurable permeance was estimated to be $9.6 \times 10^{-11}$ mol/($m^2$ S Pa).

Carbon dioxide and $CH_4$ single gas and mixture permeation was investigated as a function of temperature and pressure drop for some membranes. For low pressure mixture separations, mass flow controllers were used to mix pure $CO_2$ and $CH_4$ gases. For high-pressure mixture separations, a premixed $CO_2$/$CH_4$ cylinder gas was used. The total flow rate was 1300 mL/min for most of the experiments. The pressure on each side of the membrane was independently controlled between 84 kPa and 7.2 MPa. To carry out gas separation below room temperature, the membrane module and some system lines were placed into an ethyl glycol/water (50/50) bath. The lowest temperature investigated was about 250 K. The compositions of the feed, retentate, and permeate streams were measured using a Hewlett-Packard 5890/series II gas chromatograph equipped with a thermal conductivity detector and HAYESEP-D column (Alltech). The oven, injector, and detector temperatures were all kept at 423 K.

$CO_2$/$CH_4$ Room Temperature Results

Table 1 shows permeation properties at 295 K for a 50/50 $CO_2$/$CH_4$ mixture (222 kPa feed pressure and 138 kPa pressure drop) for four membranes (M1-M4) prepared using the methods of the invention. These four membranes each had four synthesis layers. Each of the three membranes with the CHA structure had a $CO_2$/$CH_4$ separation selectivity in excess of 100. The presence of SAPO-5 (structure: AFI; pore size: 0.74 nm) in the membrane significantly increased the permeances and decreased the selectivity.

TABLE 1

| Membrane* (Si/Al ratio) | Structure | Permeance (mol/($m^2 \cdot s \cdot Pa$)) | | $CO_2$/$CH_4$ selectivity |
|---|---|---|---|---|
| | | $CO_2 \times 10^7$ | $CH_4 \times 10^9$ | |
| M1 (0.3) | CHA | 1.1 | 1 | 110 |
| M2 (0.2) | CHA | 1.1 | 0.84 | 130 |
| M3 (0.15) | CHA | 1.2 | 0.67 | 170 |
| M4 (0.1) | CHA + AFI | 2.4 | 6.1 | 39 |

Figure 4:
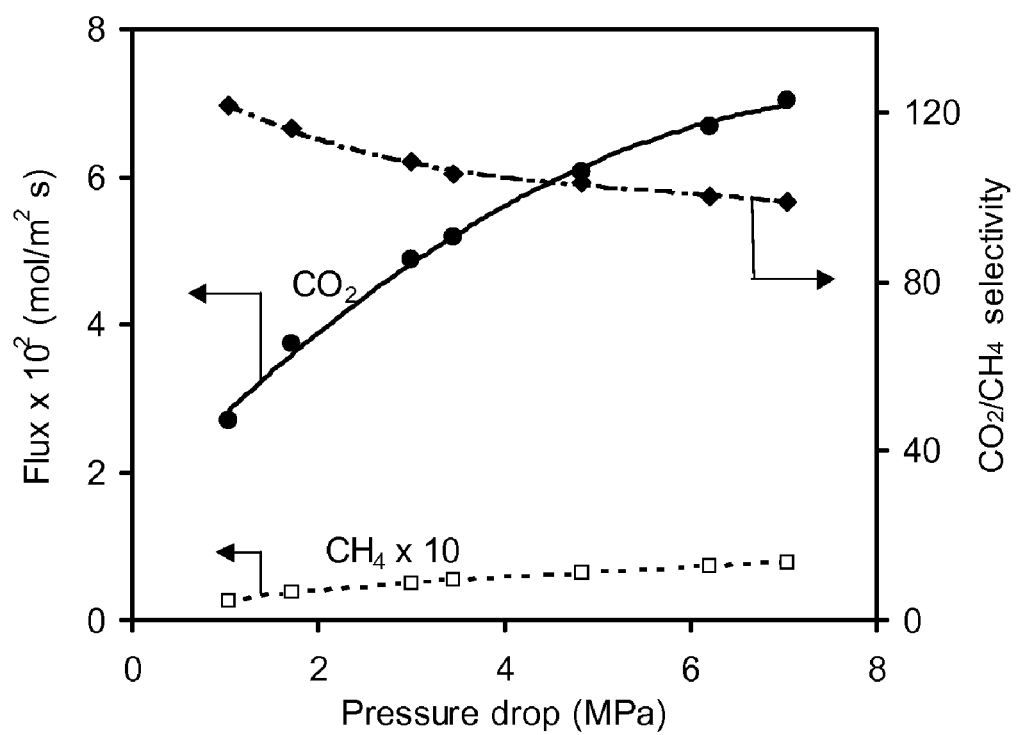
FIG. 4 shows fluxes and $CO_2/CH_4$ selectivity for $CO_2/CH_4$ mixture (50/50) at 295 K as a function of pressure drop for SAPO-34 membrane M3 of Example 4. The permeate pressure was 84 kPa.

FIG. 4 shows fluxes and $CO_2$/$CH_4$ separation selectivity for $CO_2$/$CH_4$ mixture (50/50) at 295 K as a function of pressure drop for SAPO-34 membrane M3. The permeate pressure was 84 kPa. The separation selectivity decreased slightly as pressure drop increased; at a pressure drop of 7 MPa a selectivity of 100 was obtained. In addition, the $CO_2$ permeate concentration was still as high as 98.9% at 7 MPa (not shown in FIG. 4).

$CO_2/CH_4$ Results below Room Temperature

Figure 5:
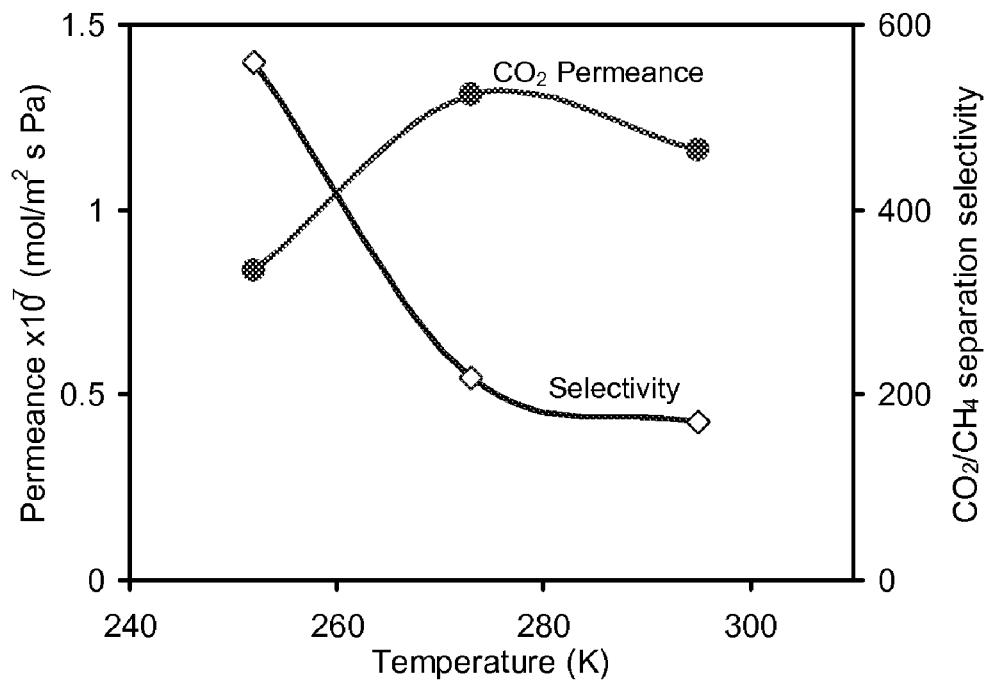
FIG. 5 shows $CO_2$ permeance and $CO_2/CH_4$ selectivity of a $CO_2/CH_4$ mixture (50/50) as a function of temperature for an SAPO-34 membrane M3 of Example 4. The feed and permeate pressures were 222 and 84 kPa.

FIG. 5 shows $CO_2$ permeance and selectivity of a 50/50 $CO_2/CH_4$ mixture as a function of temperature for H-SAPO-34 membrane M3. The feed and permeate pressures were 222 and 84 kPa. As shown in FIG. 5 the $CO_2/CH_4$ separation selectivity increased dramatically as the temperature decreased below room temperature for membrane M3. The $CO_2$ permeance exhibited a maximum at 273 K, with the permeance value being $1.3 \times 10^{-7}$ mol/(m² S Pa).

Example 5

Transport Properties for the SAPO-34 Membranes of Example 2

Table 2 shows permeances and $CO_2/CH_4$ separation selectivities at 295 K for a 50/50 $CO_2/CH_4$ feed at 222 kPa and a permeate pressure of 84 kPa for membranes with two synthesis steps at 493 K.

TABLE 2

| Membrane | Permeance (mol/(m²·s·Pa)) | | $CO_2/CH_4$ Selectivity |
|---|---|---|---|
| | $CO_2 \times 10^7$ | $CH_4 \times 10^9$ | |
| S1 | 4.0 | 3.5 | 115 |
| S2 | 3.5 | 2.9 | 120 |
| S3 | 4.0 | 4.3 | 94 |

Table 3 shows the effect of crystallization temperature on permeances and $CO_2/CH_4$ separation selectivities at 295 K for a 50/50 feed at 222 kPa and a permeate pressure of 84 kPa. Three membranes were prepared at each temperature. Two synthesis steps (24 h for each synthesis step) were applied for all membranes. All the ± values are standard deviations.

TABLE 3

| Crystallization Temperature (K) | Permeance (mol/(m²·s·Pa)) | | $CO_2/CH_4$ Selectivity |
|---|---|---|---|
| | $CO_2 \times 10^7$ | $CH_4 \times 10^9$ | |
| 473 | 4.5 ± 0.58 | 7.5 ± 0.83 | 59 ± 5.0 |
| 493 | 3.8 ± 0.29 | 3.6 ± 0.68 | 110 ± 14 |
| 503 | 3.7 ± 0.28 | 3.7 ± 0.39 | 102 ± 3.6 |
| 513 | 4.3 ± 0.22 | 5.0 ± 0.39 | 87 ± 10 |
| 533 | 3.6 ± 0.082 | 1.2 ± 0.027 | 30 ± 0.90 |

Table 4 shows the effect of the number of synthesis steps on permeances and $CO_2/CH_4$ separation selectivities at 295 K for a 50/50 feed at 222 kPa and a permeate pressure of 84 kPa. One membrane was prepared with 1 synthesis step, 3 membranes were prepared with 2 steps, and 2 membranes were prepared with 3 steps. Each synthesis step was carried out at 493 K for 24 h. All the ± values are standard deviations.

TABLE 4

| Number of synthesis steps | Permeance (mol/(m²·s·Pa)) | | $CO_2/CH_4$ Selectivity |
|---|---|---|---|
| | $CO_2 \times 10^7$ | $CH_4 \times 10^9$ | |
| 1 | 7.7 | 720 | 1.1 |
| 2 | 3.8 ± 0.29 | 3.6 ± 0.68 | 110 ± 14 |
| 3 | 2.1 ± 0.18 | 4.0 ± 0.69 | 53 ± 4.7 |

Figure 6:
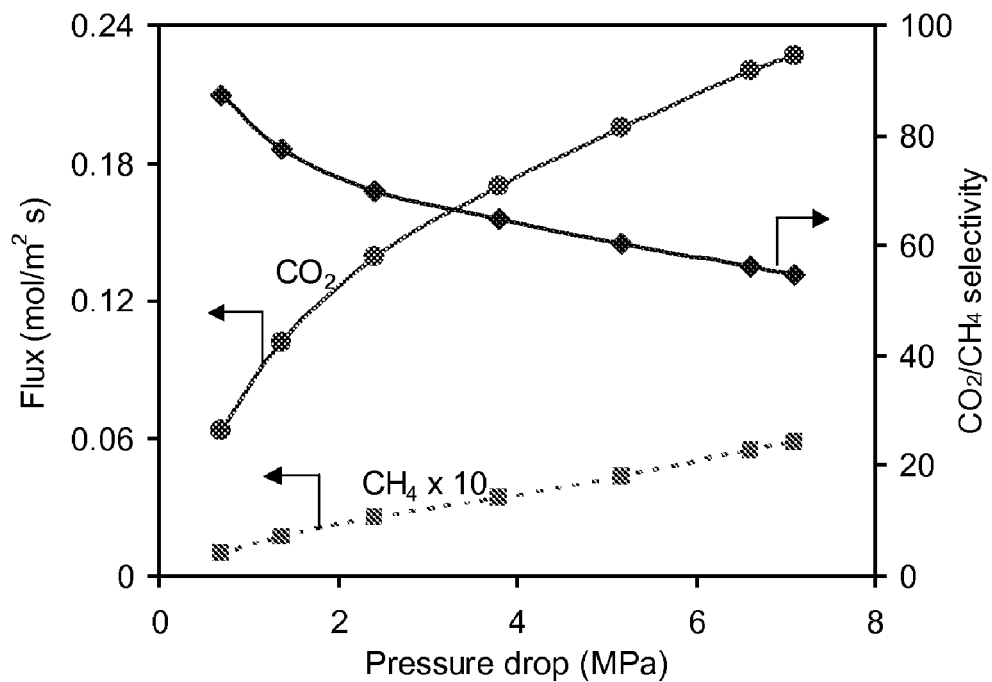
FIG. 6 shows fluxes and $CO_2/CH_4$ selectivity for a $CO_2/CH_4$ mixture (50/50) at 295 K as a function of pressure drop for SAPO-34 membrane S2 (Example 5). The permeate pressure was 84 kPa.

FIG. 6 shows fluxes and $CO_2/CH_4$ separation selectivity for $CO_2/CH_4$ mixture (50/50) at 295 K as a function of pressure drop for a SAPO-34 membrane S2. The permeate pressure was 84 kPa. The separation selectivity decreased as pressure drop increased; at 7 MPa pressure drop, a selectivity of 55 was obtained. Fluxes kept increasing with pressure drop. At a pressure drop of 7.0 MPa, the $CO_2$ flux was 39 kg/(m² h), the permeate was 97.5% $CO_2$ (not shown in FIG. 6).

Example 6

Transport Properties for the SAPO-34 Membrane of Example 3

Figure 7:
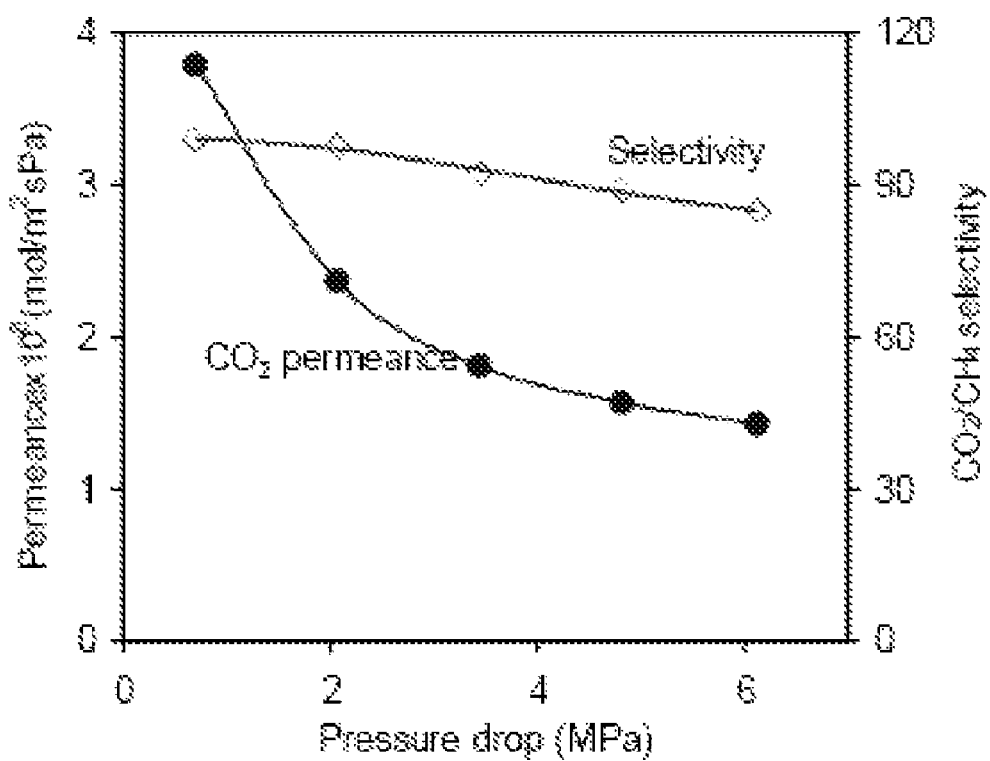
FIG. 7 shows $CO_2$ permeance and $CO_2/CH_4$ separation selectivities at 295 K for a 50/50 $CO_2/CH_4$ mixture and a permeate pressure of 84 kPa for the Na-SAPO-34 membrane of Example 6.

FIG. 7 shows $CO_2$ permeance and $CO_2/CH_4$ separation selectivities at 295 K for a 50/50 $CO_2/CH_4$ mixture and a permeate pressure of 84 kPa for the Na-SAPO-34 membrane of Example 3.

The invention claimed is:

1. A method for making a crystalline silicoaluminophosphate-34 (SAPO-34) membrane, the method comprising the steps of:
   a) providing a porous support having a pore size between 0.1 microns and 6 microns, the surface of the support having non-porous and porous portions;
   b) applying a first quantity of SAPO-34 crystalline material to at least part of the surface of the porous support prior to step e) by contacting SAPO-34 crystals with the surface, wherein the first quantity of crystalline material is in the form of SAPO-34 crystals, the average size of the SAPO-34 crystals applied to the surface of the support is between 100 nm and 1000 nm and the size of the crystals is small enough so that some of the crystals lodge within the pores of the support and the SAPO-34 crystals on the nonporous portions of the surface do not form a continuous layer;
   c) preparing an aqueous SAPO-34 forming gel comprising an organic templating agent;
   d) aging the gel;
   e) contacting the porous support with the gel;
   f) following step e), heating the porous support and the aged gel to form a second quantity of SAPO-34 crystalline material on the support, thereby forming a cumulative layer of SAPO-34 crystals on the surface of the support, wherein said support and said gel are heated to a temperature between 470 and 515 K;
   g) repeating steps e) and f) at least once to form a cumulative layer of SAPO-34 crystals on the surface of the porous support having a thickness less than 5 microns ; and
   h) calcining the SAPO-34 layer to remove the templating agent, wherein the gel comprises aluminum, phosphorus, silicon, oxygen, a templating agent and water, with the ratio of silicon to aluminum being greater than 0.1 and less than or equal to 0.6 and following step h) the permeance of $CO_2$ through the membrane is greater than $3.0 \times 10^{-7}$ mol/(m² s Pa) and the $CO_2/CH_4$ separation selectivity is greater than 90 for a 50/50 $CO_2/CH_4$ mixture at 295 K with a feed pressure of 222 kPa and a pressure differential across the membrane of 138 kPa.

2. The method of claim 1, wherein the ratio of silicon to aluminum is 0.15 to 0.3.

3. The method of claim 2, wherein the ratio of silicon to aluminum is 0.15 to 0.2.

4. The method of claim 1, wherein the templating agent is a quaternary organic ammonium templating agent.

5. The method of claim 1, wherein the gel composition comprises 1.0 $Al_2O_3$:

$aP_2O_5$: $bSiO_2$: $cR$: $dH_2O$ where R is a quaternary organic ammonium templating agent and a is between about 0.01 and about 52, b is between about 0.3 and about 0.6, c is between about 0.2 and about 5, and d is between about 20 and about 300.

6. The method of claim 1, wherein the composition of the SAPO-34 crystals applied to the surface in step b) is substantially similar to composition of the crystalline material formed in step f).

7. The method of claim 1, wherein the support is in the form of a tube having an inner and an outer surface, and the SAPO layer is formed on only one of the inner or outer surface.

8. The method of claim 1, wherein the support has an upper and a lower surface and the SAPO layer is formed on only one of the upper or lower surface.

9. The method of claim 1, wherein the gel is aged at least 24 hours.

10. The method of claim 1, wherein the gel is aged at a temperature between about 10° C. and 75° C.

11. The method of claim 1, wherein steps e) and f) are repeated once.

12. The method of claim 1, wherein steps e) and f) are repeated until the SAPO layer is substantially impermeable to $N_2$ before performing step g).

13. The method of claim 1, further comprising washing and drying the support and the SAPO layer after step f).

14. The method of claim 1, wherein the layer of SAPO-34 crystals is formed on one side of the support.

15. A supported membrane comprising a layer of SAPO-34 crystals on the surface of a porous support, the layer having a thickness less than 5 microns and the support having a pore size between 0.1 microns and 6 microns wherein the permeance of $CO_2$ through the membrane is greater than $3.0 \times 10^{-7}$ mol/ $m^2$ s Pa and the $CO_2/CH_4$ separation selectivity is greater than 90 for a 50/50 $CO_2/CH_4$ mixture at 295 K with a feed pressure of 222 kPa and a pressure differential across the membrane of 138 kPa.

16. The membrane of claim 15, wherein the thickness of the SAPO layer is about 2.5 microns.

17. The membrane of claim 15, wherein the $CO_2/CH_4$ separation selectivity is greater than 100 for a 50/50 $CO_2/CH_4$ mixture at 295 K with a feed pressure of 222 kPa and a pressure differential across the membrane of 138 kPa.

18. A method for separating a first gas component from a gas mixture containing at least a first and a second gas component, the method comprising the steps of:

a) providing a membrane of claim 15, the membrane having a feed and a permeate side and being selectively permeable to the first gas component over the second gas component;

b) applying a feed stream including the first and the second gas components to the feed side of the membrane; and c) providing a driving force sufficient for permeation of the first gas component through the membrane, thereby producing a permeate stream enriched in the first gas component from the permeate side of the membrane.

19. The method of claim 18, wherein the first gas component is carbon dioxide and the second gas component is methane.

* * * * *